United States Patent [19]

Moore, III et al.

[11] 4,391,384
[45] Jul. 5, 1983

[54] AUTOMOBILE BODY PANEL HOLE CLOSURE

[75] Inventors: Dan T. Moore, III; Michael F. Fischer, both of Cleveland Heights, Ohio

[73] Assignee: Dan T. Moore Co., Cleveland, Ohio

[21] Appl. No.: 330,483

[22] Filed: Dec. 14, 1981

[51] Int. Cl.³ .............................................. B65D 41/00
[52] U.S. Cl. .................................... 220/359; 220/307; 220/315
[58] Field of Search ....................... 220/307, 315, 359

[56] References Cited

U.S. PATENT DOCUMENTS

| | | | |
|---|---|---|---|
| 3,851,794 | 12/1974 | Hehl | 220/359 X |
| 3,990,604 | 11/1976 | Barnett et al. | 220/307 |
| 4,094,436 | 6/1978 | Birmingham | 220/315 |
| 4,290,536 | 9/1981 | Morel | 220/359 |

*Primary Examiner*—George T. Hall
*Attorney, Agent, or Firm*—Pearne, Gordon, Sessions, McCoy, Granger & Tilberry

[57] ABSTRACT

A closure for a panel hole which includes a heat activatable gasket that permanently expands into positive fluidtight sealing engagement with opposed marginal surfaces of the panel and a rigid closure plate.

11 Claims, 7 Drawing Figures

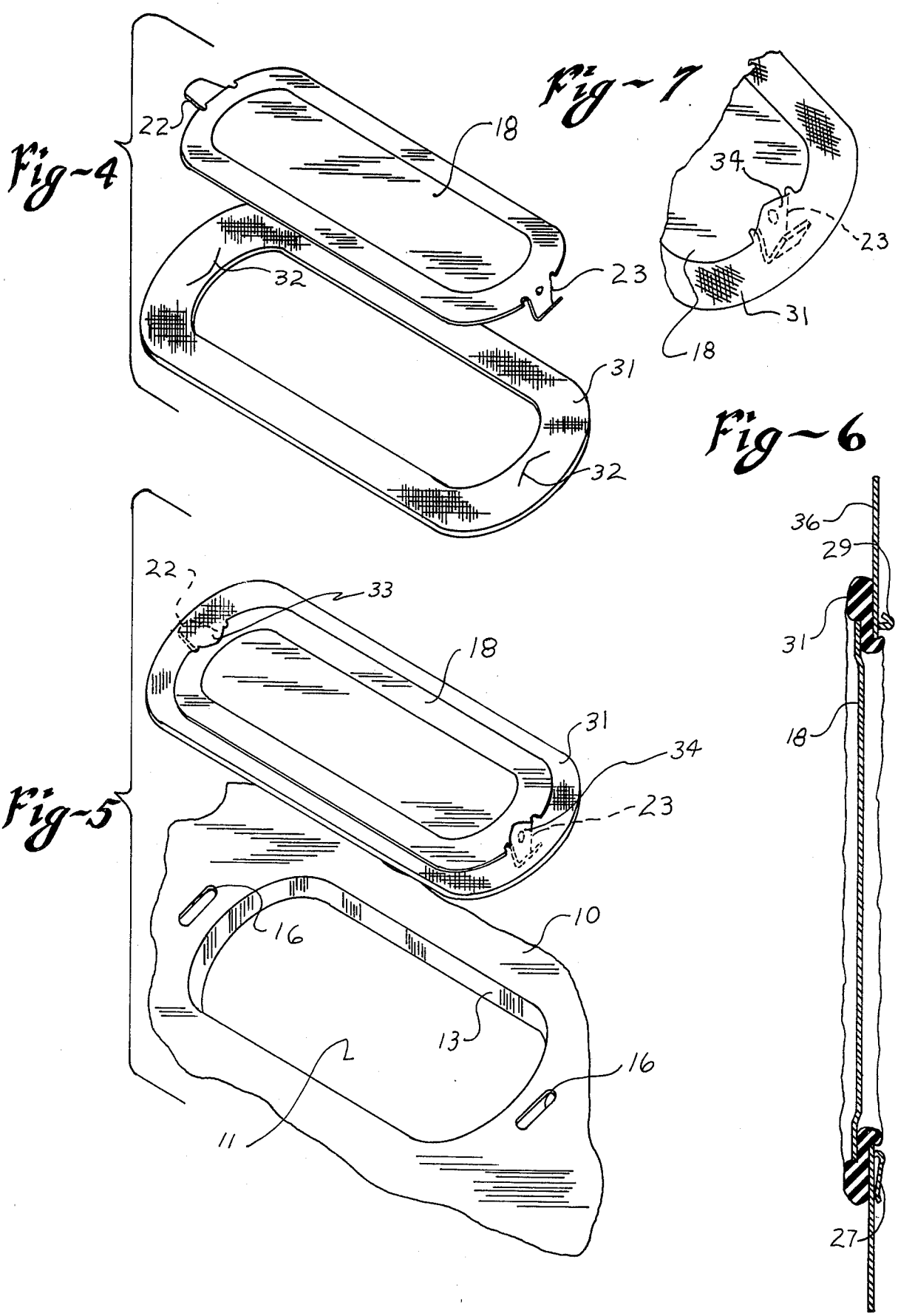

AUTOMOBILE BODY PANEL HOLE CLOSURE

BACKGROUND OF THE INVENTION

The invention relates to an improved closure for covering and sealing an aperture in a panel such as an automobile body and, in particular, to closures which include heat-activated gasket means for effecting a liquidtight seal with a panel over an associated aperture.

Prior Art

Panels, walls, and like elements in various products, structures, and machines are provided with apertures that subsequently require closures. In automobiles, for example, a floor panel or similar side wall panel may be formed with one or more apertures that serve as gauge holes to index the panel in a fixture and/or as drain holes for excess rustproofing, primer and paint applied in a dip tank. After a gauge or drain hole has served its primary function in a manufacturing process, it is necessary to close it to exclude moisture, road dirt, noise and exhaust fumes. U.S. Pat. Nos. 3,990,604 to Barnett et al. and 4,094,436 to Birmingham, and U.S. Reissue Pat. No. 30,326, to van Buren, Jr., disclose closures for this general type of application. The closures of these patents comprise a rigid plate with a plurality of resilient retaining fingers and a plastic sealing ring encircling the plate rim. The sealing ring, when subjected to elevated temperatures in a paint baking oven, is intended to melt and flow into contact with the perimeter of the hole over which the plate is positioned. The sealing effectiveness can be impaired if subjected to a baking cycle with relatively high temperatures and/or of long duration, and the sealant can melt out and fall away from the panel and closure. Moreover, the orientation of the closure of this general type is limited to the top of a relatively horizontal plane above a panel hole, since flow of the sealant material is induced primarily by gravity. Inclined, vertical or underside orientations of such prior art closures are not possible. In addition, these closures seem to fail when subjected to extreme temperature shocks or differentials for reasons which are not understood at this time.

SUMMARY OF THE INVENTION

The subject invention provides a panel closure with a heat-activated foam sealant gasket for panel holes which is adapted to be used in substantially any orientation, which yields improved sealing effectiveness, and which substantially eliminates pinhole openings and crevices between the panel hole and the closure. The closure comprises a rigid plate with an attached gasket preform which undergoes a high degree of permanent volumetric expansion out from the plane of the plate when subjected to elevated temperatures. The gasket preform, preferably, has the ability to cross-link and solidify whereby exposure to elevated temperatures causes initial flow to establish sealing contact with opposing surfaces of the panel and closure plate, followed by a setting of the gasket material. This effectively eliminates any tendency of the material to melt out from the zone to be sealed.

In the preferred embodiment, the gasket material is provided as a blank die cut from sheet stock. The blank is slit at spaced points corresponding to mounting tabs provided on the plate. Such tabs are inserted into the slits to provisionally attach the gasket to the plate and permit the plate and gasket to thereafter be handled and installed as a unit.

The bulk sheet stock gasket material or the gasket blanks are preferably coated on both sides with a hot melt adhesive suitable for use at the elevated temperature to which the closure is to be subjected. Such adhesive improves bonding of the gasket material to the substrate surfaces formed by the panel and plate.

BRIEF DESCRIPTION OF THE DRAWINGS

FIG. 4 is a perspective view of a closure plate and gasket preform prior to their assembly;

FIG. 5 illustrates the closure plate and gasket preform in an assembled state and projected over the panel hole; and FIG. 6 is a sectional view of the closure installed over a hole in a vertical panel.

FIG. 7 is an enlarged view of the end portion of the panel closure showing how the tips of the gasket overlap the plate on the side opposite from the gasket.

DESCRIPTION OF THE PREFERRED EMBODIMENT

Figure 1:
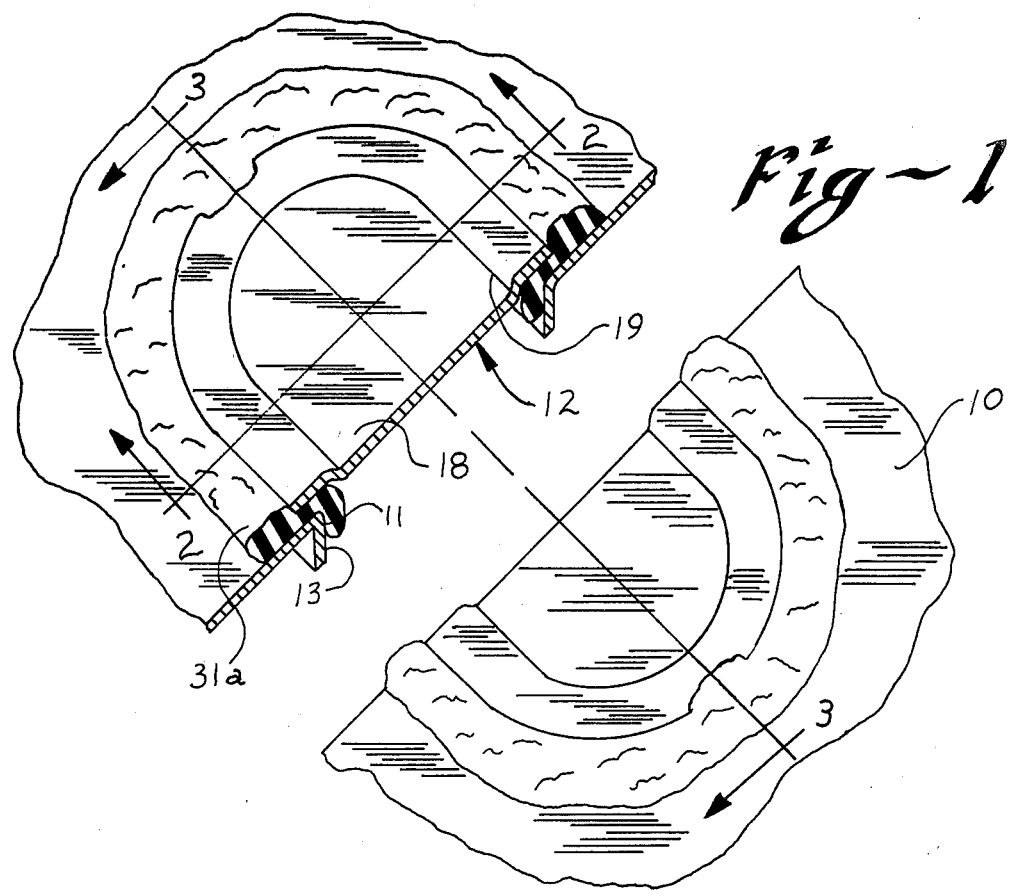
FIG. 1 is a perspective, fragmentary view of a panel provided with a hole and a closure embodying the invention.

Referring to FIGS. 1 and 5, a panel 10 is provided with a hole 11 and a closure 12 plugging the hole. The disclosed panel represents, for example, a typical floor panel in an automobile or other vehicle. In the usual case, the panel 10 is fabricated from sheet steel stock. The hole 11 is punched or otherwise formed in the panel 10 and has its perimeter bounded by a continuous lip or flange 13 integral with the remainder of the panel and substantially perpendicular to the plane of the panel. In the illustrated case, the hole 11 is oblong in plan view. The hole 11 can serve to gauge the position of the panel 10 during manufacturing or assembly processes and as a drain for excess primer, rustproofing, and paint where the panel 10 is immersed in a dip tank or otherwise flooded with a liquid coating. At each end of the hole 11 in the panel 10, identical elongate openings 16, transverse to the length of the hole 11 and symmetrical with respect to the hole, are punched or otherwise formed in the panel.

Referring to FIG. 4, the closure 12 comprises a plate body 18 of rigid sheet material having dimensions corresponding to and preferably slightly larger than the hole 11. In automotive vehicle use, the closure plate 18 can be sheet steel which is galvanized on one or both sides for corrosion resistance and is in the order of 0.015 to 0.030 inch thick. A shallow embossment or depression having its outline designated by the numeral 19 may be provided to stiffen the plate 18.

Figure 3:
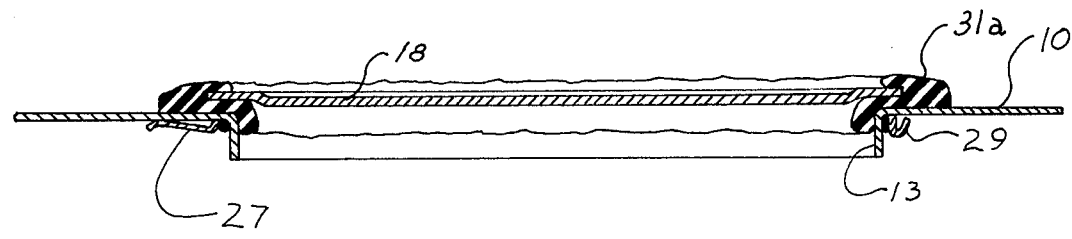
FIG. 3 is a view similar to FIG. 2, taken along the line 3—3 of FIG. 1.

Means for attaching the plate 18 to the panel 10 comprise tabs 22 and 23 at opposed ends of the plate. Referring to FIGS. 3 and 4, one tab 22, which is rigid and preferably integral with the plate 18, is generally L-shaped in cross section having a portion 26 proximate to the plate 18 and a portion 27 distal from the plate and extending generally parallel to the plane of the plate. The opposite tab 23 is generally J-shaped in cross section, as viewed in FIG. 3, with a proximate stem portion 28 generally perpendicular to the plane of the plate 18 and a distal hook portion 29 extending obliquely to the plane of the plate.

The closure 12 also includes a gasket which is originally supplied as a flat, annular body 31 in the order of about 0.050 inch thick. The illustrated gasket 31 is blanked from a web of sheet material in any suitable known manner. The material of the gasket body has elastomeric properties and foams when heated, as hereinafter described. In the illustrated case, the gasket blank 31 has the oblong configuration of the plate 18, but with its outer periphery somewhat larger than the plate and its inner periphery approximately the size of the hole 11.

At a spacing corresponding to the distance between the proximate tab portions 26, 28, i.e., the portions of the tabs which are generally perpendicular to the plane of the plate, the gasket blank is cut with identical, wide or open V-shaped or angled slits 32 along lines transverse to its length. The length of the slits 32 moderately exceeds the common width of the tabs 22 and 23 to facilitate assembly of the gasket. The gasket 31 and plate 18 are assembled together prior to installation on the panel 10, as shown at the top portion of FIG. 5. This separate assembly is accomplished by pushing the tabs 22, 23 through the slits or holes 32 so that the gasket tips 33 and 34 are on the side of the plate 18 opposite from the gasket 31, as best shown in the partial enlargement of FIG. 7. This is important to ensure a liquidtight seal. When this assembly is complete, the gasket 31 is mechanically held to the plate by the free or distal portions 27, 29 of the tabs 22, 23, which engage adjacent areas of the gasket. Preferably, the slits 32 are symmetrically arranged on the gasket blank 31 so that, for ease of assembly, either end orientation and, ideally, either face of the gasket is compatible with the pattern of the tabs 22, 23.

Suitable materials for the gasket 31 are thermoplastic elastomers particularly polyolefins, such as ethylene-propylene copolymers, polyethylene, ethylene copolymers, terpolymers and ionomers; polyvinyl chloride polymers, and styrene-butadiene block copolymers. Either one and preferably both sides of the gasket 31 may be coated with a flowable hot-melt adhesive containing, preferably, at least one polar component to facilitate adhesion to the metal of the panel 10 and plate 18.

The gasket material is preferably susceptible to gradual cross-linking during exposure to elevated temperatures because this cross-linking provides a gradually increasing melt point and an increased resistance to flow so that if the gasket material is subjected to excessively high baking temperatures and/or excessively long baking periods through accident, inadvertence, and the like, there is a reduced chance that it will melt out from the interstices between the plate 18 and panel 10. This cross-linking also increases the resistance of the gasket material to solvents such as gasoline and oil. The adhesive should flow and wet out on the panel 10 and plate 18 when the gasket is subjected to heat activation to cause it to foam. The gasket is filled with chemical blowing agent or physical foaming agent or inherently has chemical properties so that when the material is subjected to a predetermined temperature, it foams and undergoes considerable permanent volumetric expansion, as is well known in the art.

The gasket material should expand at least about 75% by volume, and preferably between 100% and 150% at 113° C., and 175% to 300% at 177° C. The material should preferably have a durometer A hardness in the uncured state of between 75 and 90, and a density in the uncured state of about 1 gram per cubic centimeter. It must also have the water and solvent resistance required for its application, as will be apparent to those skilled in the art.

The disclosed gasket and plate assembly closure 12, as previously indicated, is particularly suited for use in closing panel holes in automotive bodies. A widely used process in the manufacture of automotive bodies involves the step of immersing or flooding a body structure that includes the equivalent of the panel 10 in a primer or rustproofing bath. When raised from the bath, the hole 11 serves to drain the primer or rustproofing from the panel 10. After the coating of primer or rustproofing which is retained on the body has set, ordinarily by baking it in an oven, the closure 12 can be positioned on the hole 11. With the preformed gasket blank hooked on the plate tabs 22, 23, this is accomplished by first inserting the free end section 27 of the rigid tab 22 into one of the elongated openings 16 and thereafter pushing the hook-shaped tab 23 into the opposite hole 16. This assembly procedure is facilitated, according to one aspect of the invention, by configuring the tabs 22, 23 to provide clearance for the thickness of the gasket blank when the plate is installed over the hole. This is accomplished by making the length of the proximate portion 26 of the rigid tab 22 and the spacing of the free end of the hook portion 29 of the other tab 23 from the plane of the plate 18 a distance greater than the combined thickness of the gasket blank and gauge thickness of the panel 10.

The closure 12 is then heated to at least about 110° C. in order to cause the agent in the gasket 31 to be activated and form a foam. The closure 12 thus effects a fluidtight seal with the panel 10 over the hole 11. In the automotive application previously referred to, such exposure to elevated temperatures is conveniently carried out when the panel is exposed to elevated air temperatures in a paint baking oven. Such processing ordinarily follows the spraying of finish paint coats on the exterior body panels.

In one successful embodiment of the invention in an automotive application, the gasket material was formulated to be activated at air baking temperatures of between 113° C. and 204° C. for a time period of between 15 minutes and 45 minutes.

The relatively large volumetric expansion experienced by the gasket material when heat-activated has the important benefit of completely sealing the annular zone between the marginal area of the panel 10 surrounding the hole 11 and the confronting marginal area of the plate 18. The volumetric expansion capacity of the gasket blank is made to exceed any gaps between the pre-expanded gasket blank, plate, and panel in this zone. Thus, any warpage in the panel 10 and plate 18 or any dimensional variation in the configuration of the tabs 22, 23 is accounted for by this excess expansion capacity. Inspection of FIGS. 2 and 3 reveals that empty crevices between the panel 10 and plate 18 are effectively eliminated by expansion of gasket material. In automotive applications, for instance, this is highly advantageous, since it reduces the risk of poultice-type corrosion which could occur in the area between the closure and panel. Preferably, the selected gasket material when expanded and cooled forms a relatively soft foam which is comparatively easy to deflect, so that only minimum strain is placed upon the adhesive bond between it and the panel and plate surfaces when subjected to vibration, testing, thermal expansion, contraction, etc., during service.

Figure 2:
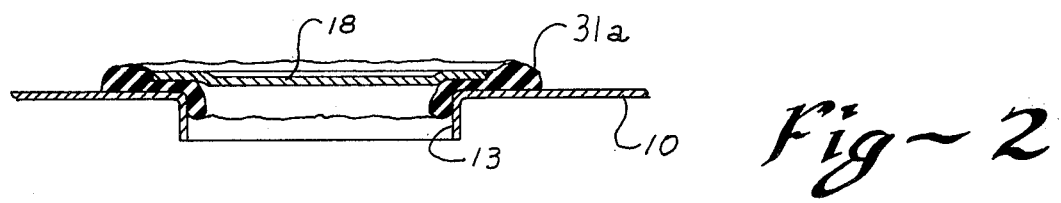
FIG. 2 is a sectional view of the panel and closure taken along the line 2—2 indicated in FIG. 1.

The volumetric expansion of the gasket material when subjected to heat activation improves the reliability of the fluidtight seal effected by the gasket between the panel and plate in a conventional automotive application where the plate extends horizontally over the panel, such as illustrated in FIGS. 1 through 3. In such case, gravity can be relied upon to draw the plate 18 towards the panel 10 and, for the most part, the gasket material need only account for warpage of the panel, plate, or both.

It will be apparent, moreover, that the volumetric expansion capacity permits use of the closure 12 in orientations other than horizontal, such as with a vertical panel 36 illustrated in FIG. 6. Similarly, the closure can be installed in a horizontal or inclined plane beneath a panel with the gasket preform blank interposed between the plate and panel. In such vertical, inclined, and underside applications, the foaming capacity of the gasket material predominates over the effects of gravity. The gasket material is thus capable of bridging the moderate gaps which can exist between the plate and panel, as limited by the geometry of the tabs 22, 23 regardless of the particular relative orientations of the plate and panel.

Other forms of tabs or attaching means may be used on the closure plate 18 such as those shown in U.S. Pat. Nos. 3,990,604 and 4,094,436, and U.S. Reissue Pat. No. 30,326. The plate and tab arrangement shown herein, however, is preferable to the ones shown in the above-noted patents because it is more positive and less expensive. As is apparent from the drawings and description, the gasket 31 is placed on the side of the closure plate 18 facing the panel 10 so that, as installed, it is between the plate and panel. An advantage of the arrangement shown in the drawings is that the gasket 31 is attached to the plate by the tabs 22 and 23 disposed through the slits 32. Obviously, other means of attaching the gasket to the plate can be employed before it is expanded. For example, the gasket can be adhered to the plate.

Although the preferred embodiment of this invention has been shown and described, it should be understood that various modifications and rearrangements of the parts may be resorted to without departing from the scope of the invention as disclosed and claimed herein.

What is claimed is:

1. A closure for a hole in a panel such as a body panel in an automotive vehicle, comprising a plate having dimensions complementary to and somewhat larger than the hole, means for attaching the plate to the panel, a gasket having dimensions at least as large as the hole, the gasket being of an elastomeric material responsive to the application of heat to expand to a relatively high degree, means attaching the gasket to the plate prior to assembly with the panel hole, the heat expansion capacity of the gasket being sufficient to ensure that any gaps existing between the plate and the opposed areas of the panel surrounding the hole permitted by the plate attaching means and resulting from manufacturing tolerances in the fabrication of the panel hole and plate are closed.

2. A closure as set forth in claim 1, wherein said gasket is capable of volumetric expansion in the range of approximately 100 to 275 percent when baked in air temperatures in a range of approximately between 235° F. and 400° F. for a time period of approximately between 15 and 45 minutes.

3. A closure as set forth in claim 1, wherein said gasket is formed of a thermoplastic material that increases in melt temperature through cross-linking upon exposure to elevated temperatures, whereby the tendency of said gasket to melt out of the gap between the panel and the plate is reduced.

4. A closure as set forth in claim 1, in which the means for attaching the plate to the panel are tabs which extend through angled slits in the gasket and also attach the gasket to the plate, the tips of the gasket at the slits being on the side of the plate opposite from the tabs.

5. A closure as set forth in claim 1, wherein said gasket material foams in a manner which results in a nonporous, substantially closed cell foam structure.

6. A closure as set forth in claim 1, wherein at least one side of said gasket is coated with a hot melt adhesive suitable for activation at temperatures to which said closure is exposed to cause expansion of said gasket, said adhesive improving the seal forming ability of said gasket with one of said plate and panel members.

7. A closure for a hole in a panel such as a body panel in an automotive vehicle, comprising a plate having dimensions complementary to and somewhat larger than the hole, the plate including means for interengaging with complementary areas of said panel, a gasket having dimensions at least as large as the hole, the gasket being responsive to the application of heat to expand into sealing contact with peripheral areas of the plate and marginal areas of the panel surrounding the hole, the gasket being formed of a thermoplastic material which increases in resistance to melt with exposure to elevated temperature whereby subsequent to initial heating and expansion, it exhibits a reduced tendency to flow and thereby reduces the risk of melting out from contact with the plate and panel upon exposure to abnormally high temperatures and/or abnormally long time periods of exposure to elevated temperatures.

8. A closure for a hole in a panel such as a body panel in an automotive vehicle, comprising a plate having dimensions complementary to and somewhat larger than the hole, the plate including means for attaching it to the panel, a gasket having dimensions at least as large as the hole, the gasket being an annular blank die cut from sheet stock, the gasket being responsive to the application of heat to permanently expand to a relatively high degree, means attaching the gasket to the plate prior to assembly with the panel hole, with the gasket being on the side of the plate which faces the panel so that when attached the gasket is between the plate and the panel, the heat expansion capacity of the gasket being sufficient to ensure that any gaps existing between the plate and opposed areas of the panel surrounding the hole permitted by the plate attaching means and resulting from manufacturing tolerances in the fabrication of the panel hole and plate are closed.

9. A closure as set forth in claim 8, wherein said gasket attaching means comprises at least one opening in the gasket blank, the plate attaching means being disposed in said opening and provisionally gripping said gasket blank prior to assembly with said panel.

10. A closure as set forth in claim 9, wherein at least one side of said gasket blank is coated with a hot melt adhesive to improve the seal formed by said gasket upon exposure to heat.

11. A closure for a hole in a panel such as a body panel in an automotive vehicle, comprising a thin, generally planar plate having dimensions complementary to and somewhat larger than the hole, the plate including tab elements extending out of the plane of the plate for interengaging with complementary areas of said panel, a self-supporting, generally annular gasket having outer peripheral dimensions larger than the hole, the gasket being responsive to the application of heat to permanently expand at least 100% by volume, the surfaces of the gasket being covered with a means provisionally attaching the gasket to the plate prior to assembly with the panel hole, with the gasket being on the side of the plate which faces the panel so that when attached the gasket is between the plate and the panel, the permanent heat expansion capacity of the gasket exceeding the volume of any gaps existing between the plate and opposed areas of the panel surrounding the hole permitted by the tab elements and resulting from manufacturing tolerances in the fabrication of the panel hole and plate, whereby the gasket material exudes inwardly from the periphery of the hole to reduce the risk of poultice corrosion in the interstices between the outer margin of the plate and inner periphery of the hole.

* * * * *

UNITED STATES PATENT AND TRADEMARK OFFICE
CERTIFICATE OF CORRECTION

PATENT NO. : 4,391,384

DATED : July 5, 1983

INVENTOR(S) : Dan T. Moore and Michael F. Fischer

It is certified that error appears in the above—identified patent and that said Letters Patent is hereby corrected as shown below:

Column 2, line 45, after "or", insert --is--; and

Column 7, line 9, after "a", insert --hot melt adhesive--.

Signed and Sealed this

Thirtieth Day of August 1983

[SEAL]

Attest:

GERALD J. MOSSINGHOFF

Attesting Officer

Commissioner of Patents and Trademarks